R. A. FESSENDEN.
METHOD AND APPARATUS FOR TRANSMITTING AND RECEIVING SOUND WAVES THROUGH GROUND.
APPLICATION FILED OCT. 7, 1915.
1,270,398.
Patented June 25, 1918.
2 SHEETS—SHEET 1.
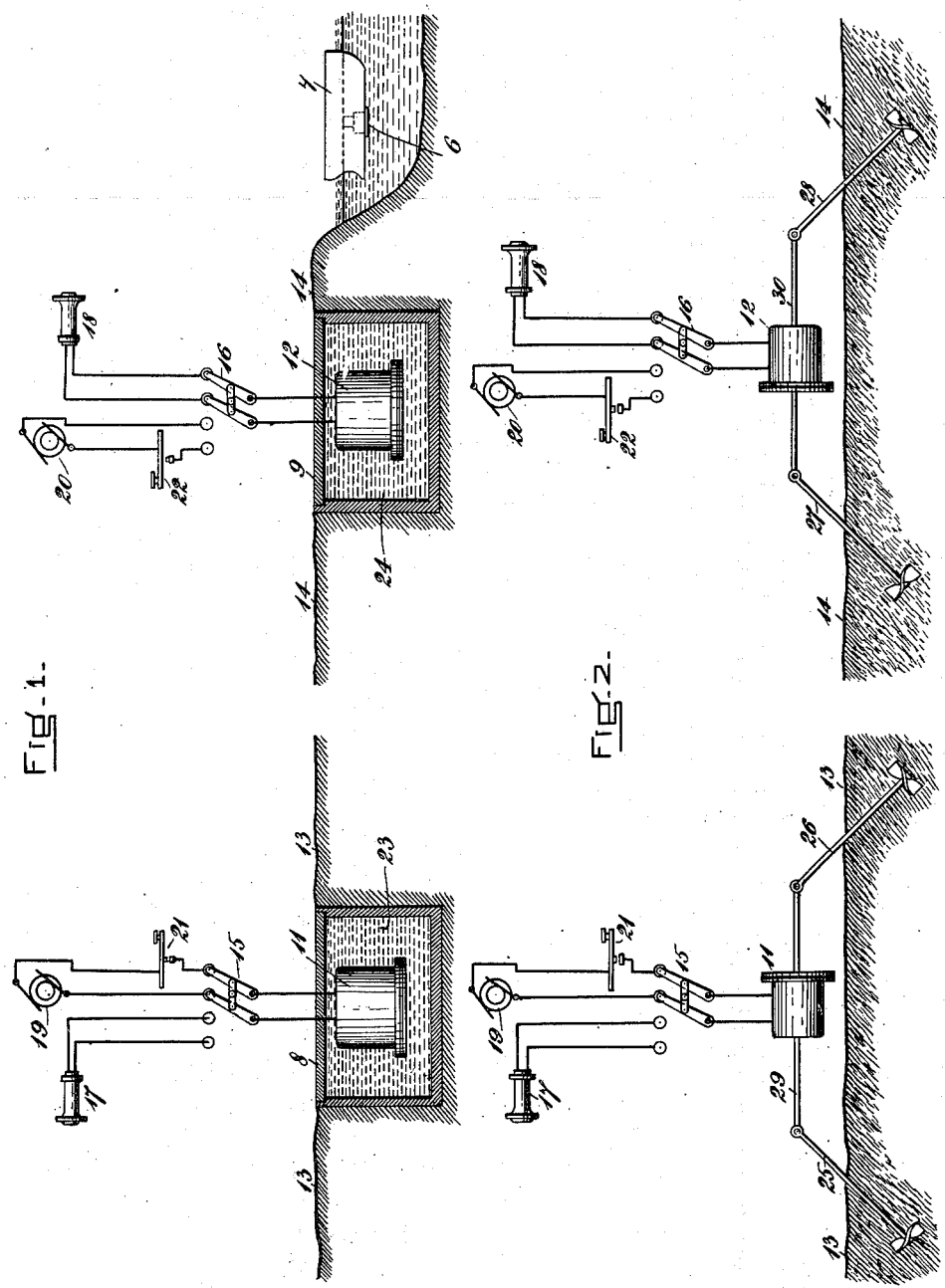
INVENTOR:
Reginald A. Fessenden
By Bellett Hayes
his attorneys.

R. A. FESSENDEN.
METHOD AND APPARATUS FOR TRANSMITTING AND RECEIVING SOUND WAVES THROUGH GROUND.
APPLICATION FILED OCT. 7, 1915.
1,270,398.
Patented June 25, 1918.
2 SHEETS—SHEET 2.
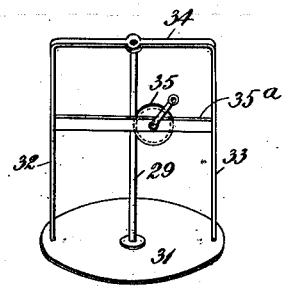
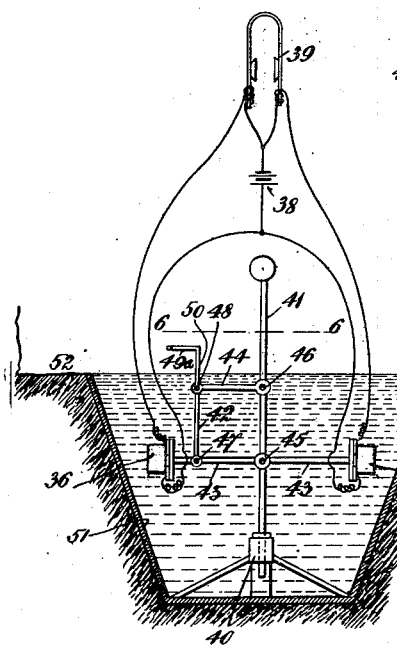
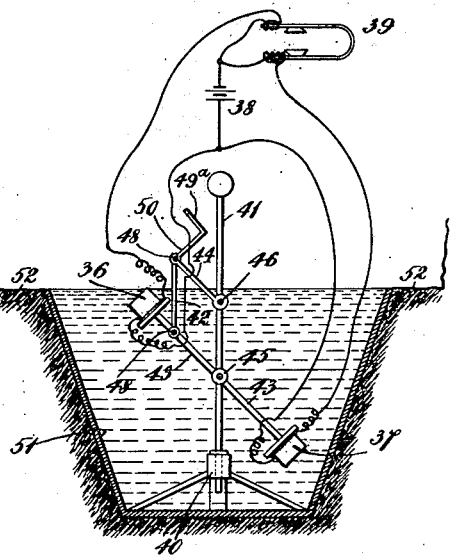

UNITED STATES PATENT OFFICE.

REGINALD A. FESSENDEN, OF BROOKLINE, MASSACHUSETTS, ASSIGNOR TO SUBMARINE SIGNAL COMPANY, OF PORTLAND, MAINE, A CORPORATION OF MAINE.

METHOD AND APPARATUS FOR TRANSMITTING AND RECEIVING SOUND-WAVES THROUGH GROUND.

1,270,398.   Specification of Letters Patent.   Patented June 25, 1918.

Application filed October 7, 1915. Serial No. 54,556.

*To all whom it may concern:*

Be it known that I, REGINALD A. FESSENDEN, a citizen of the United States, residing at Brookline, in the county of Norfolk and State of Massachusetts, have invented new and useful Improvements in Methods and Apparatus for Transmitting and Receiving Sound-Waves Through Ground, of which the following is a specification.

This application is a continuation in part of my application Serial No. 744,793, filed January 29, 1913, now Patent No. 1,207,388, dated Dec. 5, 1916.

This invention has for its object the transmission and receipt of sound waves or impulses through the ground; also the determination of the direction of transmission of said waves or impulses; also the determination of the location of the place of transmission of said waves or impulses, also the elimination of disturbing waves or impulses.

This method differs from all methods heretofore used in signaling through the earth in that the signal-producing or receiving instrument is not in such direct contact with the earth as to vibrate with the same phase or amplitude as the earth itself at the transmitting or receiving point and that an additional sound-receiving element is introduced, that is, the water or anchor which forms an intermediate element to be used between the vibratory diaphragm or corresponding element of the signal-producing or receiving element and the ground contact, thereby avoiding losses from reflection and from the bending and irregular travel of the sound waves, and also performing other useful functions, for example, enabling the true direction of the sound to be obtained and amplifying by mechanical resonance, or other advantages as hereinafter set forth.

There are in addition other novel features hereinafter set forth and described.

In the drawings—

Figures 1 and 2 illustrate diagrammatically two arrangements of apparatus for carrying out my invention, combined sending and receiving stations being shown;

Fig. 3 is another form of sending device;

Figs. 4 and 5 show diagrammatically a means for determining the direction from which sound is received;

Fig. 6 being a top view of the sighting device shown therein, taken on line 6—6 of Fig. 4.

In Fig. 1, 13, 13, 14, 14, is the surface of the ground. 23, 24 are fluid tight tanks, of cement or metal, or hewn in the rock, or dug in the ground. They are filled with water or other fluid, such as oil, or with a combination of fluids such as water and glycerin, or solutions, such as that of carbonate of soda in water. The tank is preferably placed in wet ground, or the ground is wetted so as to make good physical contact between the walls of the tank and the surrounding ground, and the walls of the tank are preferably so arranged as to transmit sound freely, for example, if cement is used, the rock of the cement should not be sound absorbent or have a velocity of sound transmission differing greatly from that of the cement itself.

The tanks are preferably covered over to prevent evaporation, by covers 8 and 9.

11, 12 are devices for producing and receiving sounds, and as shown represent oscillators, of the type described in applicant's U. S. Letters Patent No. 1,167,366. They are immersed in the tanks preferably diaphragm downward. 15, 16 are two-way switches for connecting the leads of the oscillators to the alternating current dynamos 19, 20, and telegraph keys 21, 22, when the oscillators are used as sending instruments or to the telephone receivers 17, 18 when the oscillator is to be used as a receiving instrument.

When the operator at oscillator 11 wishes to telegraph, the switch 15 is thrown so as to connect the leads of 11 to the key 21 and the dynamo 19, and the operator at oscillator 12 throws the switch 16 so as to connect the leads of 12 to the telephone receiver or other electro-magnetic mechanism 18.

As will be understood by those skilled in the art telephone transmitters may be substituted for the keys 21, 22 and storage batteries for the generators 19 and 20 if it is desired to vary the resistance in the circuit instead of making and breaking it.

Fig. 2 shows an alternative arrangement in which the sound producing and receiving devices are supported above the surface of the ground though they may be supported in trenches or elsewhere. In this case each device 11, 12 is mounted on a rod or wire 29, 30, which in turn is supported by screw anchors 25, 26, 27, 28. This mounting is especially adapted to transmit and receive longitudinal vibrations while the mounting of Fig. 1 is especially adapted to transmit and receive vertical vibrations.

In the construction of Fig. 2 the vibrations originating in the oscillator or other instrument are especially lateral or horizontal vibrations which are primarily transmitted by the rod 29 and anchors 25 and 26 to the earth and are in turn picked up by the anchor 27 and delivered by the rod 30 to the oscillator 12 and the recording or indicating instrument such as the receiver 18. In this case the sounds are received mainly from two directions determined by the line in which the two anchors are placed. In this arrangement the vibrations produced and received by the oscillators are lateral in direction, and the reception is to a considerable extent directional, i. e., sounds are not received from all directions but only from two directions, determined by the line in which the two anchors are placed.

Fig. 3 shows another type of sound producing apparatus which may be used in place of the oscillator in which 31 is a diaphragm, preferably of steel or duralumin, to the center of which is attached a wire or rod 29, the other end of said wire or rod being attached to the bar 34 which is supported on rods 32, 33 attached to the diaphragm 31. The diaphragm is set in vibration by tuning the wheel 35 as shown in applicant's application, Serial No. 400,134, filed October 27, 1907.

In Figs. 4 and 5 are shown the apparatus and method of detecting the direction from which the sound waves or impulses are transmitted. For example, in time of war this apparatus may be placed in a trench and by its means the direction in which the enemy is mining or countermining may be determined.

Here 52 is the level of the bottom of the trench. 51 is a pail of water sunk in the ground, the ground around the pail being preferably wetted so as to make good physical contact between the pail and the ground. 40 is a socket made of sound-insulating material such as lead, and mounted on legs, for example, on a tripod or the like which rests on the bottom of the pail. The rod 41 has its lower end in the socket 40 so that rod 41 can rotate about a vertical axis. The rod 41 and the bars 42, 43, 44, are attached to each other by the joints 45, 46, 47, 48, permitting movement in a vertical plane. 49, 50 are sights, 50 being attached to the bar 44 which is extended above the joint 28 and 49 being attached thereto by the bar 49$^a$. A horizontal sight is obtained by sighting along 49 and a vertical sight by sighting along 50 as below described.

36, 37 are two oscillators or microphones (shown as microphones) attached to the ends of the bar 43 with their diaphragms pointing in the same direction. 39 is a differentially-wound telephone, a lead from one winding of which is connected to one of the microphones, the lead from its other winding being connected to the other microphone. The other leads of the telephone are attached to one side of the battery 53 and the other lead of each microphone to the other side of the battery.

Assume first that the differential windings are connected so as to oppose each other, which is the generally preferred way. Then the sounds traveling through the ground must reach both microphones 36, 37, at exactly the same instant if the current fluctuation produced by the sounds in microphone 36 is to annul the effect of the current fluctuation produced by the sounds in microphone 37. This will occur when the bar 43 and therefore the bar 44 is at right angles to the direction from which the sound is proceeding.

If the differential windings are connected so as to assist each other, then when the bars 43 and 44 are at right angles to the direction of the sound the sound will be a maximum, but as it is harder generally to locate the exact maximum than the exact minimum, as well as for other reasons, it is preferred to connect the differential windings so as to oppose each other.

In operation, the device is placed in the pail 51 in the bottom of the trench, the pail being filled with water or oil and the bars 43, 44 are placed horizontally, as shown at Fig. 4. The rod 41 with its attachments is then rotated around its vertical axis until the sound which strikes the microphones disappears or becomes a minimum. This will be at two positions, 180 degrees from each other, i. e. when the microphones point directly toward or directly away from the source of sound. The position in which the microphones point toward the enemy's trench will be the one to take. This gives the horizontal direction from which the sound is coming. This direction is fixed by sighting along the sight 50, and is marked on the wall of the trench.

Then the rod 41 is rotated through 90 degrees, and the bars 43, 44 are tilted as shown in Fig. 5, till the sound becomes a minimum again. Then by sighting along the sight 49, the vertical angle or dip of the direction from which the sound comes is located, and having therefore both the direction in the horizontal plane and the dip, the observer has the exact direction from which the sound is proceeding.

By taking another observation at a point a short distance along the trench, say 10 yards away, the location from which the sound is proceeding may be determined in the same way, and its place of origin will be the point at which the two lines of direction, so determined, meet, and its distance can be readily calculated.

Where the sound has a definite wave length or a strongly marked component, there will be several partial minima, but the true minimum is easily determined as it is the strongest marked, and the presence of the other minima instead of being a detriment is an assistance, since it makes the change in intensity per degree of angular movement of the apparatus more marked.

The use of the apparatus shown in Figs. 1 and 2 is not confined to telegraphing between two points inland, as one point may be inland, for example, inside a coast defense fortification, and the other station may be on a battleship 8 carrying an oscillator 7 at some point off the coast.

What I claim as my invention is:—

1. A signaling means comprising a liquid body inserted in the earth, and means in operative relation to said liquid body and adapted to set up vibrations therein whereby signals may be sent and received through the earth.

2. That method of receiving sounds through the earth which consists in setting up in a liquid body in operative connection with the earth mechanical vibrations originating in the earth and transforming said vibrations into electrical undulations.

3. Means for transmitting and receiving sounds through the earth, comprising a liquid body inserted in the earth and adapted to be set in vibration, and signaling means in contact with said liquid body.

4. A method of signaling which comprises originating vibrations in a liquid body in contact with the ground and receiving said vibrations in a second liquid body also in contact with the ground and transforming said vibrations into electrical impulses.

5. A method of signaling which comprises originating vibrations in a liquid body in contact with the ground and causing said vibrations to pass through the ground to receiving mechanism also located in a liquid body and transforming said vibrations into electrical undulations.

6. Apparatus for use in detecting or transmitting earth vibrations comprising an electrical apparatus adapted to produce in an electric circuit currents congruent with the earth vibrations, and an intermediate sound-conducting element in good conductive relationship with the earth and said electrical apparatus adapted to produce a difference of phase in the vibrations at several parts of the apparatus.

7. In a signaling mechanism, a liquid container and a signaling mechanism located therein, said liquid container being sunk in the earth and being maintained in close and intimate physical contact therewith.

8. In a signaling mechanism, a liquid container and a signaling mechanism located therein, said container being sunk in the ground, said ground being dampened and in close physical contact with said container.

9. A sound transmitter and receiver and a tank containing fluid, said transmitter and receiver being located in said tank and said tank being packed in damp ground whereby fluid contact will be made between the vessel and the ground.

10. The apparatus above described for determining the direction and location of noises, which consists in two receiving mechanisms and means whereby they may be rotated about an axis, and means whereby they are maintained in good sound-conducting contact with the ground, said means comprising a liquid container sunk in the ground and in close physical contact therewith.

11. The apparatus above described for determining the direction and location of noises which consists in two sound-receiving mechanisms and means whereby they may be rotated about an axis, and liquid means for connecting physically said mechanisms with the ground.

12. The apparatus above described for determining the direction and location of noises, which consists in two sound-receiving mechanisms and means whereby they may be rotated about a vertical axis, and means whereby they may be rotated about a horizontal axis, in combination with a liquid container sunk in the ground and in close physical contact therewith in which said sound receiving mechanisms are submerged.

13. The apparatus above described for determining the direction and location of noises, which consists in two sound-receiving mechanisms and means whereby they may be rotated about a vertical axis, and means whereby they may be rotated about a horizontal axis, and liquid means whereby a good physical contact is made between said mechanisms and the ground.

14. A signaling system comprising a container sunk in the ground and filled with liquid, a transmitter and receiver submerged in the liquid in said container, and a second container filled with liquid and having a transmitter and receiver submerged in said liquid whereby the path of the vibrations proceeding from either transmitter will be both through the ground and also through liquid.

REGINALD A. FESSENDEN.